United States Patent [19]
Kimura et al.

[11] Patent Number: 5,514,447
[45] Date of Patent: May 7, 1996

[54] GAS-INTRODUCED INJECTION MOLDING AND METHOD OF OBTAINING THE SAME

[75] Inventors: Mamoru Kimura; Takayoshi Tanaka, both of Ichihara, Japan

[73] Assignee: Idemitsu Petrochemical Co., Ltd., Tokyo, Japan

[21] Appl. No.: 232,773

[22] Filed: Apr. 25, 1994

[30] Foreign Application Priority Data

| | | | |
|---|---|---|---|
| Apr. 26, 1993 | [JP] | Japan | 5-099350 |
| Apr. 28, 1993 | [JP] | Japan | 5-102539 |
| May 20, 1993 | [JP] | Japan | 5-118540 |

[51] Int. Cl.$^6$ ........................................... B32B 3/00
[52] U.S. Cl. .................. 428/156; 428/120; 428/192; 428/212; 428/213
[58] Field of Search .................. 428/156, 172, 428/178, 81, 119, 120, 157, 166, 167, 192, 212, 213

[56] References Cited

U.S. PATENT DOCUMENTS 4,923,666  5/1990  Yamazaki ........................ 264/572

FOREIGN PATENT DOCUMENTS 2158002  11/1985  United Kingdom.

*Primary Examiner*—Donald J. Loney
*Attorney, Agent, or Firm*—Flynn, Thiel, Boutell & Tanis

[57] ABSTRACT

A gas-introduced injection molding is disclosed, which is obtained by charging molten resin into a die and introducing gas into the charged molten resin. The molding thus obtained has a sufficient thickness portion extending linearly as a framework and a sheet-like small thickness portion integral with the sufficient thickness portion and having a uniform thickness, a space being formed inside the sufficient thickness portion. Thus, even by reducing the overall thickness of the molding it is possible to ensure sufficient rigidity with the hollow portion, and the molding is thus best suited as a sheet-like product requiring a predetermined rigidity, such as an automobile bumper, a household electric product casing, etc. Such gas-introduced injection molding is produced by a method, which comprises a first step of charging molten resin into the die when the die is open to a predetermined extent from the completely closed state, a second step of closing the incompletely closed die to cause spreading of the charged molten resin, and a third step of introducing gas into the charged molten resin in the die. The second and third steps are started before the end of the first step. The molten resin in the die is thus caused to move continuously until the completion of the molding, thus preventing the generation of hesitation mark or sink mark.

13 Claims, 16 Drawing Sheets

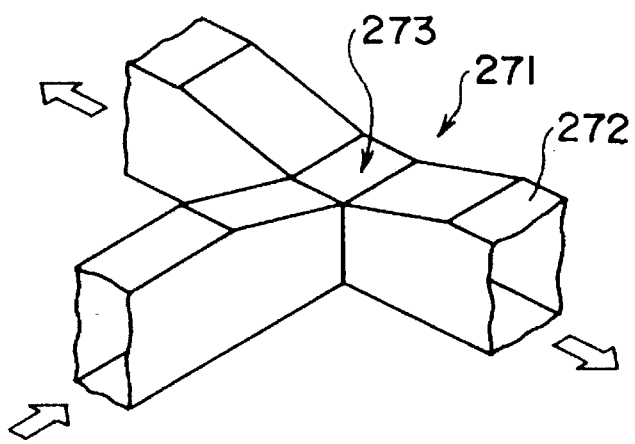
F I G. 18
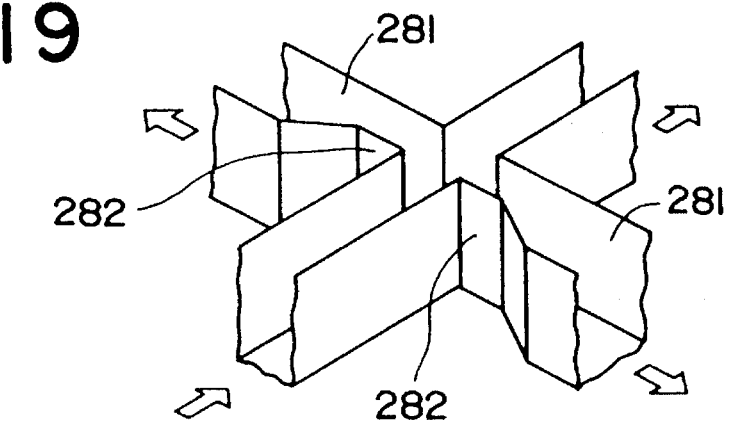
F I G. 19
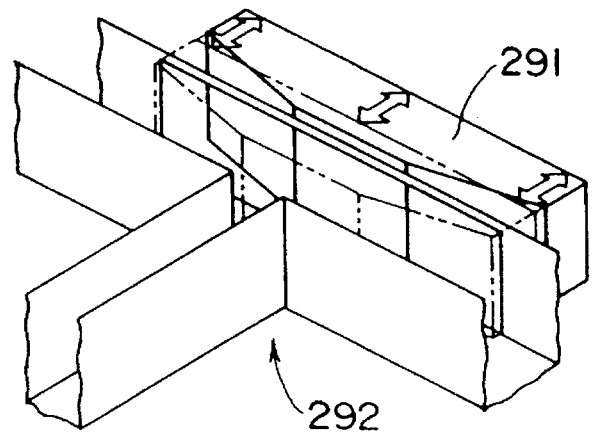
F I G. 20

F I G. 26
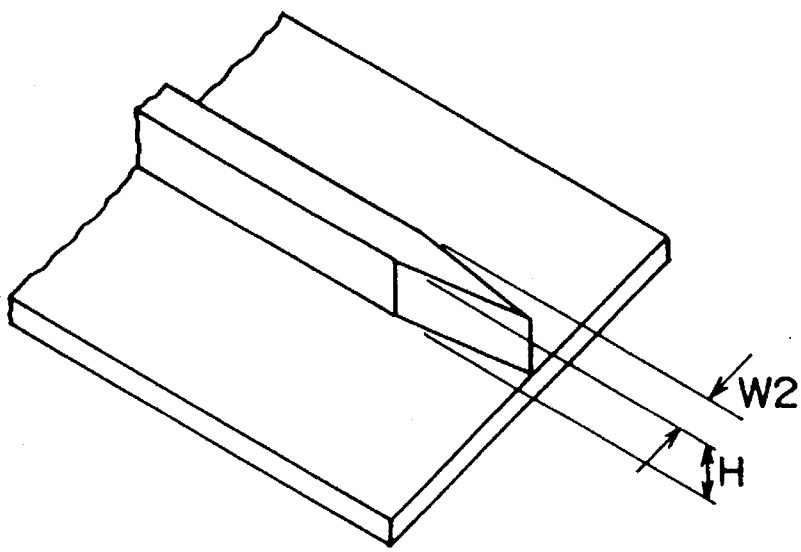
F I G. 27
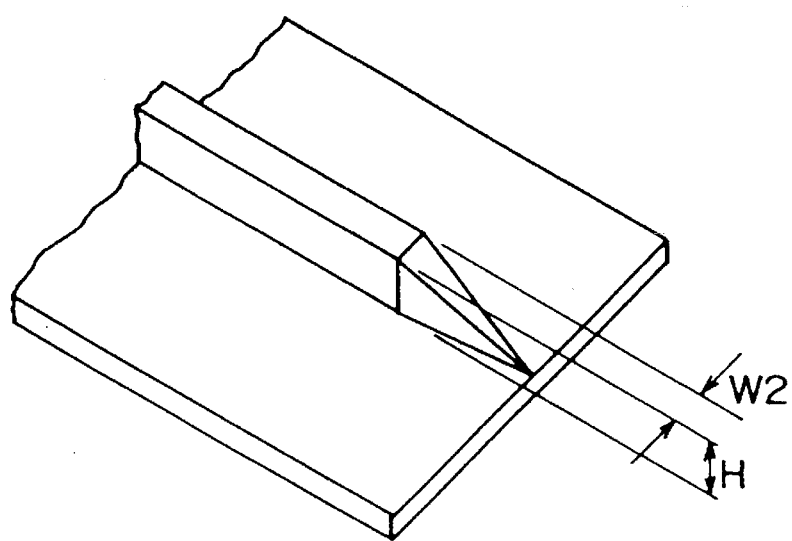

GAS-INTRODUCED INJECTION MOLDING AND METHOD OF OBTAINING THE SAME

BACKGROUND OF THE INVENTION

1. Field of the Invention

This invention relates to a gas-introduced injection molding and a method of obtaining the same, and it is applicable to the manufacture of resin products, of which the appearance and quality are important, such as automobile interior and exterior fittings, for instance bumpers, dashboards, wheel caps, door panels, etc., and also household electric product casings, television receiver cabinets, etc.

2. Description of the Related Art

The gas-introduced injection molding process is well known in the art as a method of injection molding to obtain moldings which are light in weight and highly rigid.

In this method, the injection molding is carried out while introducing an inert gas such as nitrogen gas under high pressure into molten resin filling a die cavity. In this case, with inflating force of the introduced high pressure gas it is possible to obtain a satisfactory molding product with the surface thereof free from sink mark.

There is also a gas-introduced injection molding process of developing type, in which molten resin is charged into a die, which is closed imperfectly such that the charged molten resin does not leak to the outside, and the charged molten resin is developed with the closing of the die so that the entire die cavity is filled with the molten resin.

With this process, it is possible to reliably prevent defects due to short shots because the entire die cavity can be perfectly filled with molten resin with the spread thereof caused when the die is closed.

In the prior art, however, if it is intended to produce a gas-introduced injection molding product having a reduced thickness, the thickness of resin enclosing the inner space is also reduced, thus making it impossible to obtain sufficient rigidity.

Therefore, the process is not applicable to products, which have a sheet-like portion and nevertheless is required to have a predetermined rigidity, such as automobile bumpers and household electric product casings.

Meanwhile, when the prior art gas-introduced injection molding process is applied to the production of a small thickness molding product, sufficient pushing force fails to be provided near the edges of the die cavity even during the charging of molten resin because of high resistance offered to the flow of the molten resin in the die cavity. Therefore, the leading end of the flow of molten resin is liable to be stopped tentatively.

If this occurs, by causing the molten resin to begin to start again by closing the die or by introducing gas a trace of re-flow (hereinafter referred as hesitation mark) is generated in the surface of the molding product to deteriorate the quality thereof.

An object of the invention is to provide a high quality gas-introduced injection molding, which can ensure sufficient rigidity even if it is then and is free from hesitation marks or like sink mark, and also a method of obtaining the same molding.

SUMMARY OF THE INVENTION

A first aspect of the invention resides in a gas-introduced injection molding, which is obtained by charging molten resin into a die cavity and introducing gas into the charged molten resin and has sufficient thickness portion extending linearly as a framework, and a small thickness portion integral with the sufficient thickness portion and having a substantially uniform thickness, an inner space being formed in the sufficient thickness portion.

According to the first aspect of the invention, even when the overall molding is reduced in thickness, the sufficient thickness portion has a sufficient thickness. Thus, by forming the sufficient thickness portion in required parts of the molding and forming an inner space in the sufficient thickness portion, sufficient rigidity can be ensured.

A molding is thus obtainable, which is suitable as a product having a sheet-like portion and nevertheless being required to have a predetermined rigidity, such as an automobile bumper, a household electric product casing, etc.

A second aspect of the invention resides in a method of obtaining the gas-introduced injection molding as the first aspect of the invention, which method comprises a first step charging molten resin into a die in a state opened to a predetermined extent from the perfectly closed state, a second step of developing the charged molten resin with pressure applied by perfectly closing the imperfectly closed die, and a third step of introducing gas into the charged molten resin in the die, the second and third steps being started to let the molten resin in the die to flow continuously until the completion of the molding process.

The second aspect of the invention will now be described with reference to FIG. 1.

FIG. 1 is a time chart of the gas-introduced injection molding process as the second aspect of the invention. Referring to the Figure, the first step is started by causing the start of charging of molten resin at instant 0 and ended with completion of the charging of the molten resin at instant TS.

The second step is started with resumption of the die closing at instant TP and ended with completion of the die closing at instant TE.

The third step is started with commencement of gas introduction at instant TI and ended with completion of the gas introduction at instant TC.

It is a feature of the second aspect of the invention that the instant TP of the start of the second step and the instant TI of the start of the third step are earlier than the instant TS of the end of the first step.

According to such second aspect of the invention, the second and third steps partly overlap the first step, and thus the leading end of the flow of the molten resin is moved continuously by the charging pressure in the first step, the spread in the second step and the gas introduction in the third step.

The leading end of the molten resin is thus not stopped tentatively, thus preventing the generation of any hesitation mark.

BRIEF DESCRIPTION OF THE DRAWINGS

FIG. 18 is a fragmentary perspective view concerning a modification of the second embodiment;

FIG. 19 is a fragmentary perspective view concerning a different modification of the second embodiment;

FIG. 20 is a fragmentary perspective view concerning a further modification of the second embodiment;

FIG. 26 is a fragmentary perspective view, to an enlarged scale, showing a modification of the fourth embodiment;

FIG. 27 is a fragmentary perspective view showing a different modification of the fourth embodiment;

DETAILED DESCRIPTION OF THE PREFERRED EMBODIMENT(S)

Now, embodiments of the invention will be described with reference to the drawings.

[FIRST EMBODIMENT]

Figure 1:
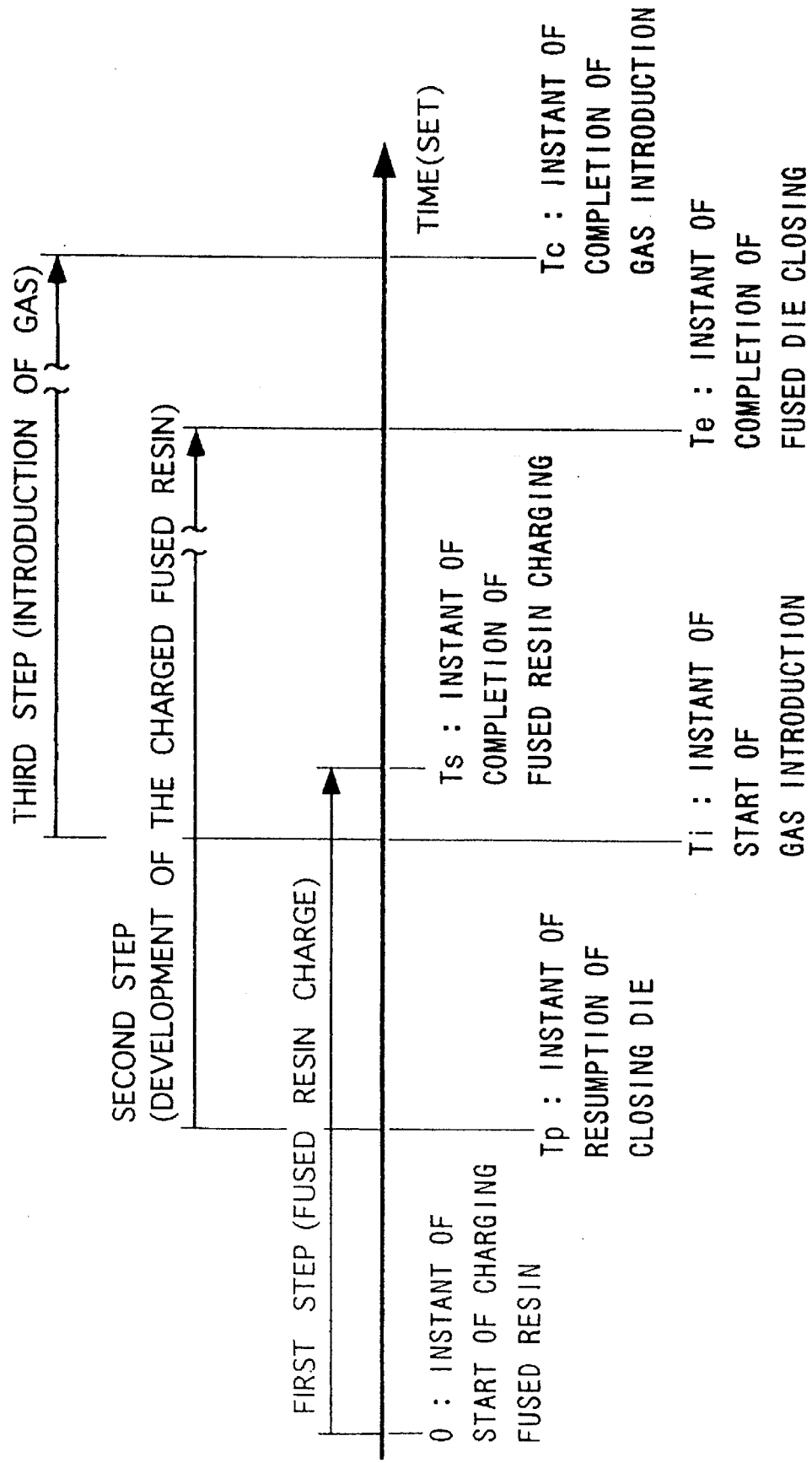
FIG. 1 is a time chart for explaining a second aspect of the invention.
Figure 2:
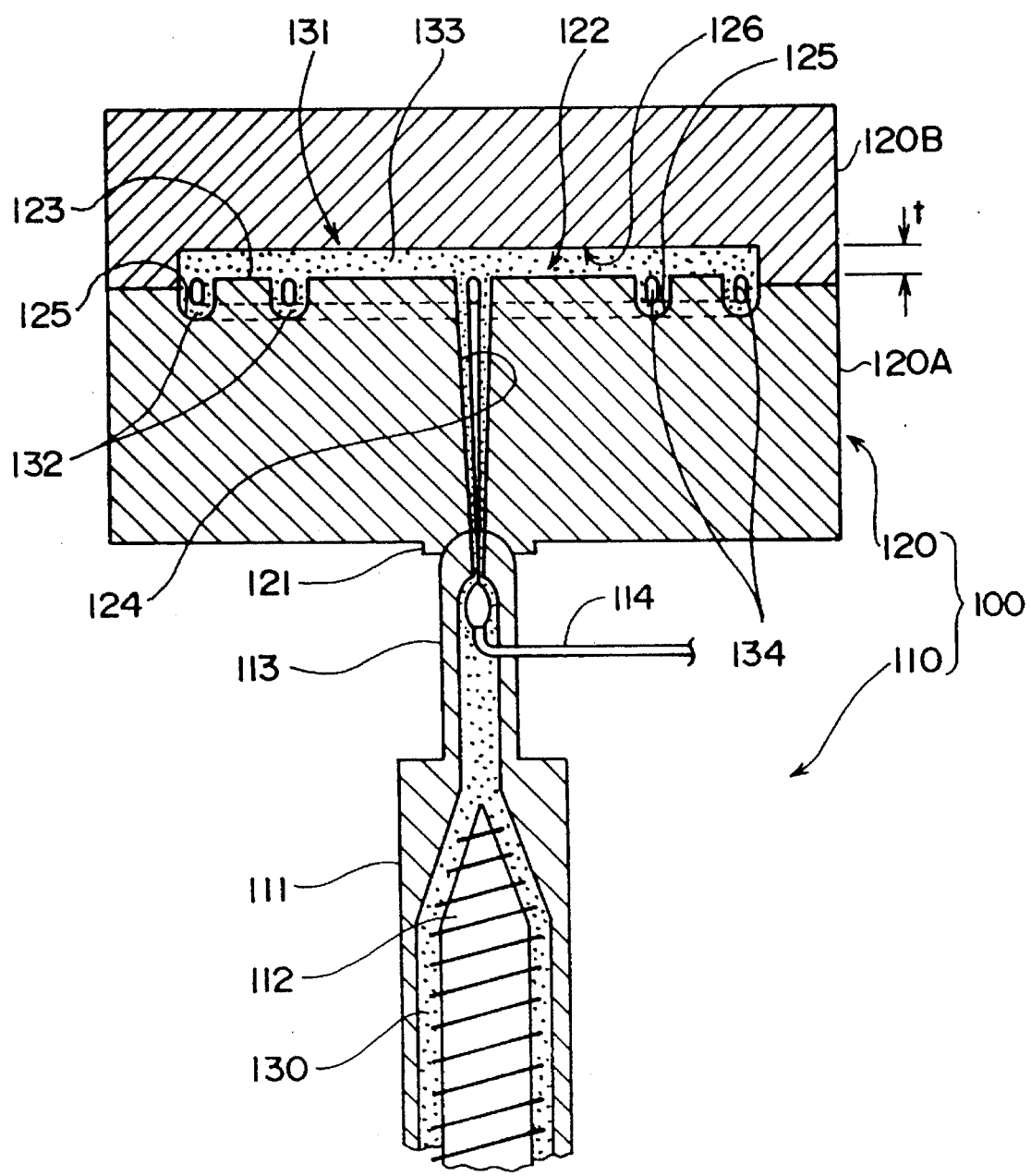
FIG. 2 is a sectional view showing a gas-introduced injection apparatus concerning a first embodiment of the invention.

FIG. 2 shows an essential part of apparatus 100 concerning a first embodiment of the invention. The apparatus 100 comprises an machine 110 for injecting a synthetic resin, and a die 120 for molding.

The machine 110 includes a cylindrical barrel 111, which accommodates a screw 112 for kneading synthetic resin 130 in the fused state. The barrel 111 has a nozzle 113 provided at the upper end as shown in the Figure. The nozzle 113 is connected to the bush 121 in the die 120 so that it can charge molten resin 130 into the die 120.

Into the nozzle 113 a gas introduction tube 114 is inserted for introducing gas into a part 131. The gas introduction tube 114 is supplied with an inert gas such as nitrogen gas under high pressure from a gas source (not shown).

As shown in the Figure, the die 120 comprises a lower core section 120A and another cavity section 120B.

Figure 3:
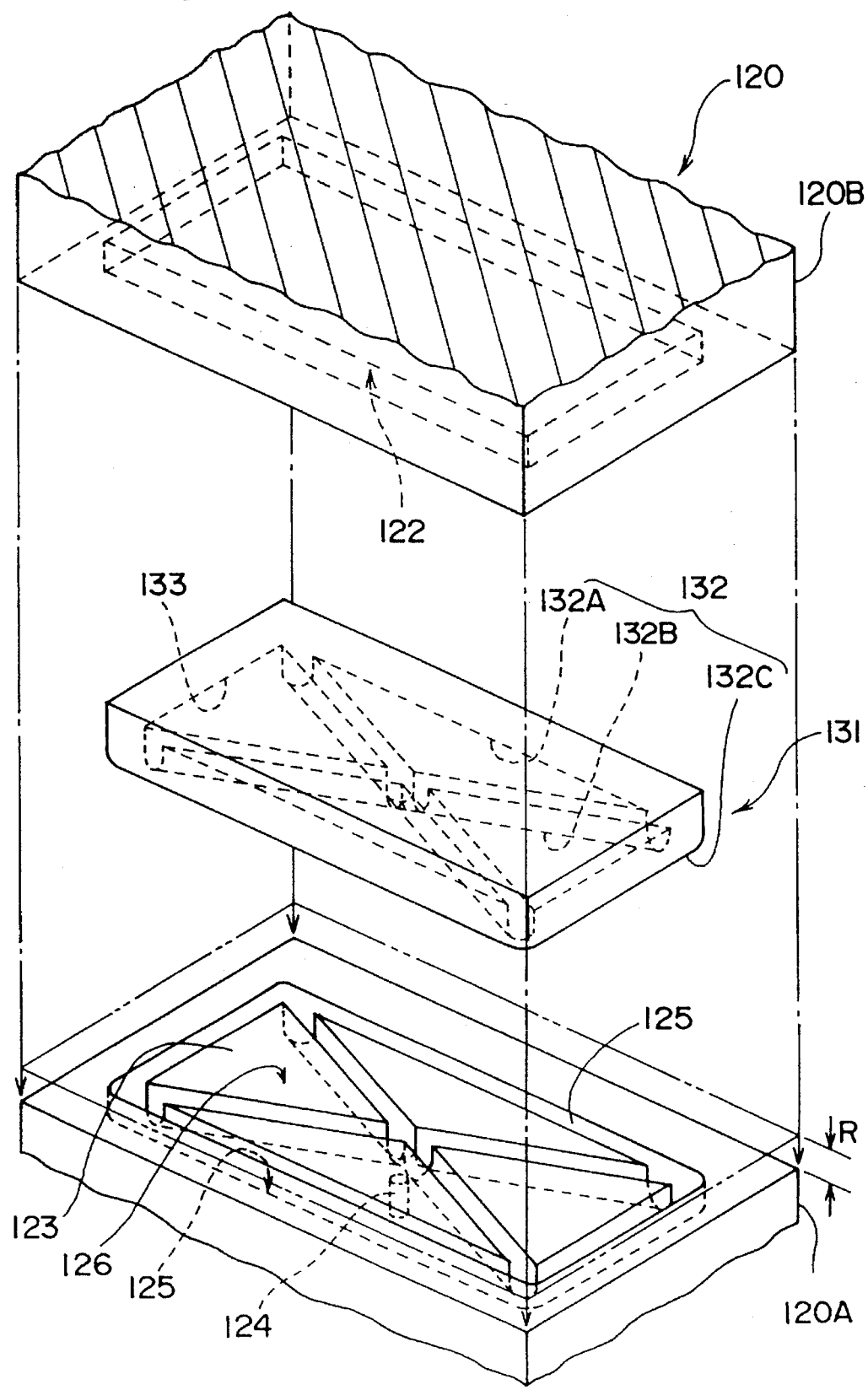
FIG. 3 is an exploded perspective view showing a die in the first embodiment.

The cavity section 120B, as shown in FIG. 3, has a cavity 122, in which a molding like a thin rectangular sheet is to be formed.

The core section 120A has a molding surface corresponding to the cavity 122 in the cavity section 120B. It also has a sprue 124 penetrating it and open at the center of the molding surface 123. Through this sprue 124 the nozzle 113 of the machine 110 that is in contact with the bush 121 can be communicated with the cavity 122.

The molding surface 123 of the core section 120A has groove-like portions 125 for sufficient thickness of framework portion formation. The groove-like portions 125 extends along the edges and diagonals of the molding surface 123. Other than the groove-like portions 125 the molding surface 123 constitutes a narrow gap portion 126 of the cavity 122 for small thickness or sheet portion formation.

By charging the molten resin 130 into between the cavity 122 and the molding surface 123, the sufficient thickness portions 132 extending linearly as a framework of the part 131 are formed in the groove-like portions 125, while the sheet-like small thickness portion 133, which has a smaller thickness than the sufficient thickness portions 132, is formed in the narrow gap portion 126.

The sufficient thickness portions 132A include straight portions extending straight along the four sides of the rectangle, straight portions 132B extending straight along the diagonals of the rectangle, and branch portions 132C interconnecting the ends of the straight portions 132A and 132B.

As shown in FIG. 2, the inside of the sufficient thickness portions 132 have gas channels 134 formed as inner spaces as a result of the passage through the charged molten resin 130 of gas introduced into the resin.

The die 120 is closed by pushing either the core or cavity section 120A or 120B toward the other with an oil hydraulic piston-cylinder assembly (not shown) or like pushing means. It is possible to hold the die 120 such that its core and cavity sections 120A and 120B are open or spaced apart to a predetermined extent R from the perfectly closed state of the die (See FIG. 3).

Figure 4A:
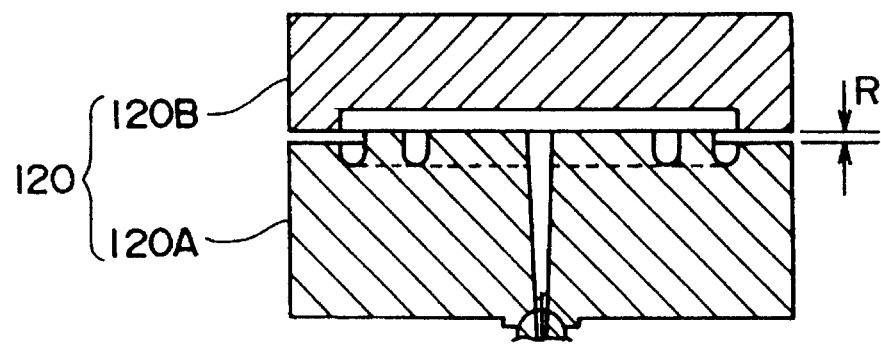
FIGS. 4(A) to 4(C) are views for explaining a process for obtaining the first embodiment.

In this embodiment, a first step of charging molten resin 130 into the die 120 is started from a state as shown in FIG. 4(A), in which the core and cavity sections 120A and 120B are open to the predetermined extent R from the perfectly closed state of the die 120.

The extent R is set in a range of 1 to 3 mm.

Figure 4B:
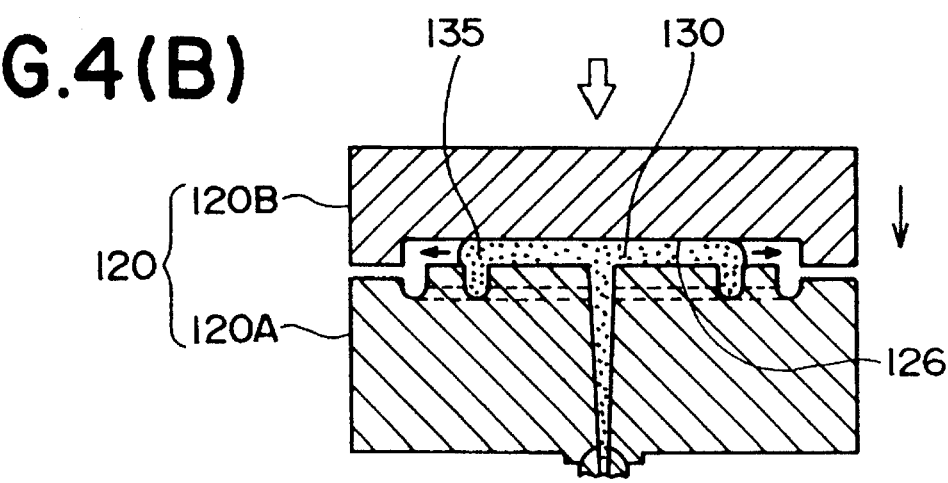

Then, when the amount of charged molten resin 130 reaches a range of 80 to 99% of the total amount to be charged into the die 120, as shown in FIG. 4(B), a second step and a third step are started simultaneously lest the leading end 135 of the flow of the molten resin 130 should be stopped.

With the start of the second step, the core and cavity sections 120A and 120B are closed toward each other to pressurize and develop the inside charged molten resin 130, thus permitting continual movement of the leading end 135 of the molten resin 130 after completion of the charging of the resin 130.

If the die is closed at a too early timing, the resistance offered to the flow in the narrow gap portion 126 is increased at an early timing, and the effect of having the die 120 held open to the predetermined extent R can no longer be obtained, thus resulting in the generation of air pocket or weld mark.

With the start of the third step, gas is introduced into the molten resin 130 charged in the die 120. The introduction of gas also has an effect of obtaining continual movement of the leading end 135 of resin.

Figure 4C:
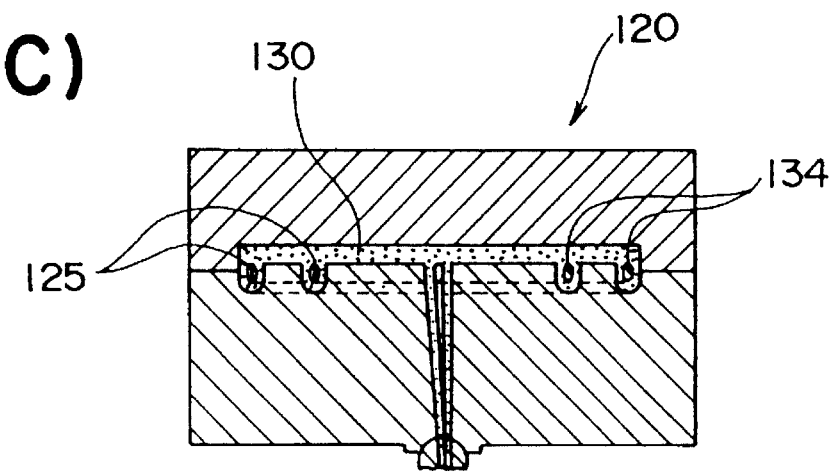

The gas introduction is carried out continually for 0.1 to 1 second after the completion of closing of the die 120, which brings an end to the second step. Thus, as shown in FIG. 4(C), gas channels 134 are formed in the molten resin 130 along the groove-like portions 125. After the gas channels 134 have been formed in the entirety of the molten resin 130, the gas introduction is completed to being an end to the third step. Afterwards, the die 120 is opened, and the part 131 is removed.

With the above embodiment, the following effects are obtainable.

The part 131 has the sufficient thickness portions 132 extending linearly as a framework and the sheet-like small thickness portion 133 integral with the sufficient thickness portions 132 and having substantially a uniform thickness, with a sufficient thickness provided for the sufficient thickness portions 132 even though the overall thickness of the molding 132 is reduced, and the gas channels 134 are formed as inner spaces in the sufficient thickness portions 132. Thus, sufficient rigidity can be ensured, and it is possible to produce a molding which is best suited as a product having a sheet-like portion and nevertheless required to have a predetermined rigidity, such as an automobile bumper, a household electric product casing, etc.

The charging of molten resin 130 into the die 120 is started with the die 120 in a state of being opened to a predetermined extent from the completely closed state so that the resistance offered to the flow of resin along the narrow gap portion 126 and that along the groove-like portions 125 do not substantially differ from each other. Thus, with the provision in the cavity 122 of the groove-like and narrow gap portions 125 and 126 having different gaps, there is no possibility for the molten resin 130 in the groove-like portions 125 having a greater gap to reach the cavity edges earlier than the molten resin 130 in the narrow gap portion 126 and flow back.

Without the flow-back of the molten resins 130, there is no possibility of collision of streams of molten resin 130 that may result when the flow-back occurs. It is thus possible to prevent generation of any weld mark which may be generated by the collision of streams of molten resin 130.

Further, the second and third steps are started before the end of the first step, the leading end 135 of the flow of molten resin 130 is moved continuously and not stopped tentatively throughout these steps by the charging pressure in the first step, the spread in the second step and the gas introduction in the third step. Thus, it is possible to prevent generation of any hesitation mark.

Further, the second and third steps are started simultaneously to ensure continual movement of the leading end 135 of the molten resin 130 with both the spread of the molten resin and the gas introduction. Thus, the propelling force to move the leading end 135 of the molten resin 130 is reinforced, and thus it is possible to prevent the tentative stopping of the leading end 135 of the molten resin 130, and hence the generation of hesitation mark, more reliably.

Further, the first step is started with the core and cavity sections 120A and 120B of the die 120 held opened to the predetermined extent R from the completely closed state of the die, the extent R being set to 1 to 3 mm, and the second and third steps are started when the amount of molten resin 130 being charged into the die 120 in the first step reaches 80 to 90% of the required amount. Thus, the above effects can be obtained reliably. Besides, the part 131 that is obtainable has a uniform quality irrespective of the number of times the injection molding is carried out.

Further, the third step is ended after the end of the second step so that the gas introduction is continued after the completion of closing of the die 120. Thus, the desired gas channels 134 can be formed reliably, and the obtained part 131 is free from sink mark.

The effects of the embodiment will now be shown in connection with specific experiment examples.

[EXPERIMENT EXAMPLES 1A TO 1C]

In Experiment Examples 1A to 1C, experiments were conducted on the gas-introduced injection molding according to the invention.

In these experiments, a die was used, which had basically the same structure as the die 120 in the above embodiment, and the experiments were conducted under conditions set in the ranges attainable according to the invention as described before in connection with the above embodiment.

TABLE 1

|  |  | *1) (MPa) | R (mm) | Tp (sec.) | Ti (sec.) | Ts (sec.) | Tc (sec.) |
|---|---|---|---|---|---|---|---|
| Exp. Ex. | 1A | 10 | 1.0 | 1.5 | 1.5 | 1.8 | 2.5 |
|  | 1B | 8 | 2.0 | 1.2 | 1.2 | 1.6 | 2.2 |
|  | 1C | 6 | 3.0 | 1.0 | 1.0 | 1.4 | 2.0 |
| Com. Ex. | 1A | 14 | 0.0 | — | 1.8 | 2.2 | 2.8 |
|  | 1B | 10 | 0.5 | 1.6 | 1.6 | 2.0 | 2.6 |
|  | 1C | 6 | 3.5 | 1.0 | 1.0 | 1.2 | 2.0 |
|  | 1D | 10 | 2.0 | 1.0 | 1.0 | 1.6 | 2.0 |
|  | 1E | 10 | 2.0 | 1.7 | 1.2 | 1.6 | 2.2 |
|  | 1F | 10 | 2.0 | 1.2 | 1.6 | 1.6 | 2.6 |
|  | 1G | 8 | 2.0 | 1.2 | 1.2 | 1.6 | 1.7 |

-LEGEND-
*1); INTRODUCED GAS PRESSURE
R; MINED EXTENT OF OPENING
Tp; INSTANT OF RESUMPTION OF CLOSING DIE
Ti; INSTANT OF START OF GAS INTRODUCTION
Ts; INSTANT OF COMPLETION OF MOLTEN RESIN CHARGING
Tc; INSTANT OF COMPLETION OF GAS INTRODUCTION
-RESULT-
Exp. Ex. 1A; Satisfactory appearance
1B; Satisfactory appearance
1C; Satisfactory appearance
Com. Ex. 1A; Gas leakage from general surface
1B; Pronounced weld
1C; Gas leakage TABLE 1-continued

| *1) | R (mm) | Tp (sec.) | Ti (sec.) | Ts (sec.) | Tc (sec.) |
|---|---|---|---|---|---|

1D; Gas leakage from general surface
1E; Gas leakage from general surface
1F; Pronounced gas line
1G; Generation of recession

[COMPARATIVE EXAMPLES 1A to 1G]

Comparative Examples 1A to 1G concern experiments on gas-introduced injection molding, which were conducted under conditions outside the ranges according to the invention for comparison to Experiment Examples 1A to 1C.

In Comparison Examples 1A to 1G, the experiments were conducted with die 120 of the same shape as in Experiment Examples 1A to 1C but under different conditions from those in Experiment Examples 1A to 1C. The conditions of molding are shown in Table 1.

Comparative Examples 1A to 1G will be described briefly.

Comparative Example 1A concerns an experiment of a usual gas-introduced injection molding experiment conducted with the die 120 held perfectly closed.

Comparative Example 1B concerns an experiment of an experiment conducted with the extent R of opening of the die 120 in the first step set to 1 mm or below.

Comparative Example 1C concerns an experiment which, unlike Comparative Example 1B, was conducted with the extent R of opening of the die 120 in the first step set to 3 mm or above.

Comparative Example 1D concerns an experiment, in which the die 120 was closed early, i.e., before the mount of molten resin 130 charged into the die 120 reached the range of 80 to 99% of the required amount.

Comparative Example 1E concerns an experiment, in which, unlike Comparative Example 1D, the die 120 was closed lately, i.e., after the completion of charging of molten resin 130.

Comparative Example 1F concerns an experiment, in which the gas introduction was started lately, i.e., at the instant of completion of the charging of molten resin 130.

Comparative Example 1G concerns an experiment of gas-introduced injection molding, in which the gas introduction was carried out for a shorter period of time, i.e., was completed before the completion of the die closing.

[Common Molding Conditions:]

In the above Experiment Examples 1A to 1C and Comparative Examples 1A to 1G, the following common molding conditions of the gas-introduced injection molding were set.

(1) Resin used: Norile
(2) Molding temperature: 270° C.
(3) Die temperature: 60° C.

The thickness t of the narrow gap portion 126 of the die 120 (see FIG. 2) was set to 1.5 mm.

[Results of Experiments:]

Figure 5:
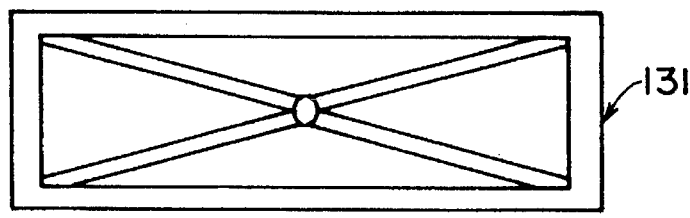
FIG. 5 is a plan view showing the result of experiment in Experiment Examples 1A to 1C according to the invention.

The results of the experiments are as follows. In the rightmost column of Table 1, the results are briefly summarized.

in Experiment Examples 1A to 1C, the part 131 obtained, as shown in FIG. 5, was satisfactory in appearance with its surface utterly free from sink mark, weld mark, hesitation, etc.

Figure 6:
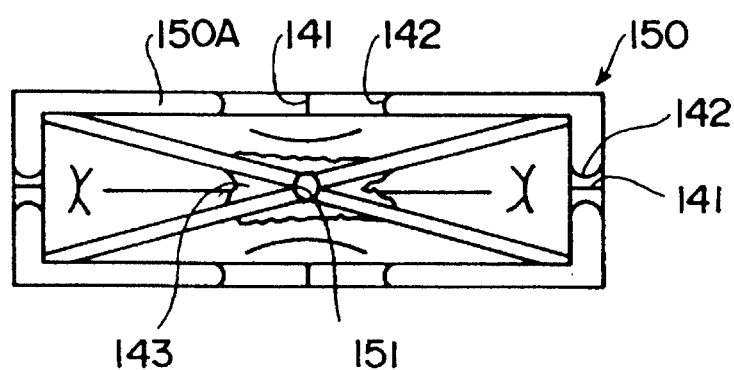
FIG. 6 is a plan view showing the result of experiment in Comparative Examples 1A, 1D and 1F.

In Comparative Examples 1A, 1D and 1E, the molding 150 obtained, as shown in FIG. 6, had both weld and hesitation marks 141 and 142 in the surfaces of its edge portions 150A. Besides, a gas leakage trace was open in general surface of its central portion in the neighborhood of a position corresponding to the sprue 151. The appearance of the molding 150 was spoiled by these defects.

Figure 7:
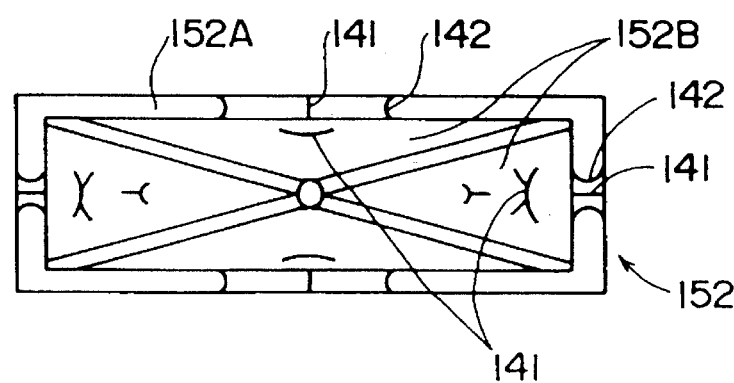
FIG. 7 is a plan view showing the result of experiment in Comparative Example 1B.

In Comparison Example 1B, as shown in FIG. 7, the molding 152 had pronounced weld marks 141 generated in the surfaces of its edge portions 152A. Only weld marks 141 were generated in the surface of the small thickness portion 152B. The appearance of the molding 152 was spoiled by these defects.

Figure 8:
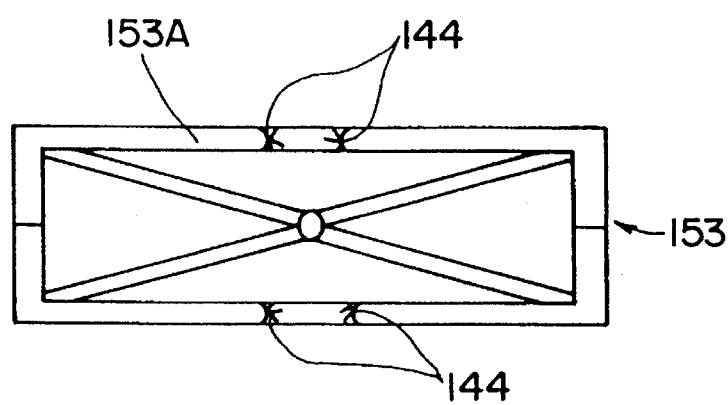
FIG. 8 is a plan view showing the result of experiment in Comparative Example 1C.

In Comparative Example 1C, the molding 153, as shown in FIG. 8, had gas leakage traces 144 which were generated in the neighborhood of the center of its long side edges 153A, thus spoiling the appearance of the molding 153.

Figure 9:
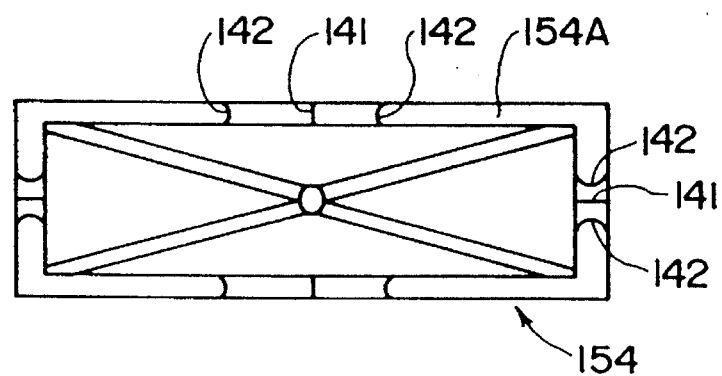
FIG. 9 is a plan view showing the result of experiment in Comparative Example 1F.

In Comparative Example 1F, the molding 154, as shown in FIG. 9, had pronounced hesitation marks 142 as well as weld marks 141 in the surfaces of its edge portions 154A, thus spoiling its appearance.

Figure 10:
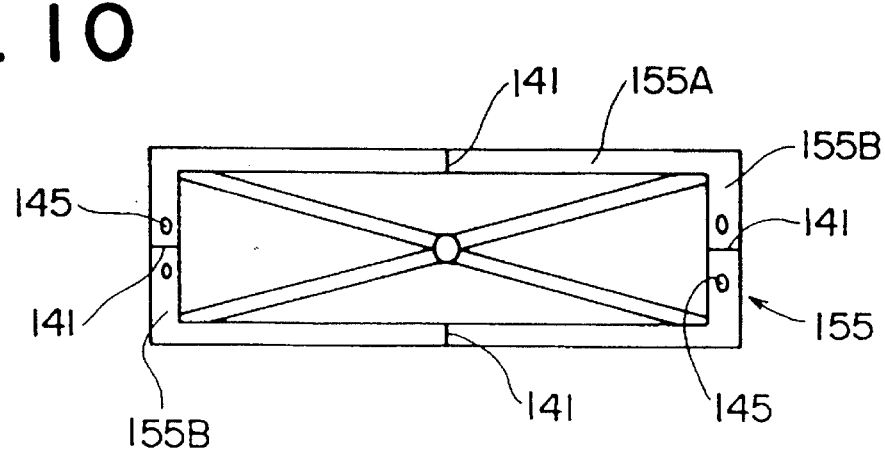
FIG. 10 is a plan view showing the result of experiment in Comparative Example 1G.

In Comparative Example 1G, the molding 155, as shown in FIG. 10, had weld marks 141 generated in the surfaces of the neighborhood of the center of both long and short side edges 155A and 155B and also had recessions formed in the surfaces of the neighborhood of the center of the short side edges 155B due to insufficient gas introduction, thus spoiling its appearance.

The above first embodiment is by no means limitative, and the following modifications are possible.

The molding part may not be planar and flat sheet-like, but it may be curved sheet-like. Further, it may not be sheet-like, but may be like a box or a container. In general, it may be of any shape so long it has a sheet-like portion having a small thickness.

The sufficient thickness portion of the molding may not be of the crossing fashion but may be lattice-like. In general, it may be provided such as to provide desired mechanical strength in desired direction.

The molten resin may not be norile but may be polypropylene or like resins.

The drive means for driving the closing part may not be the oil hydraulic piston-cylinder assembly but may be a piston-cylinder assembly of pneumatic type or electric or electromagnetic type.

The pressurized gas may not be nitrogen gas but may be argon gas or any other inert gas.

[SECOND EMBODIMENT]

Figure 11:
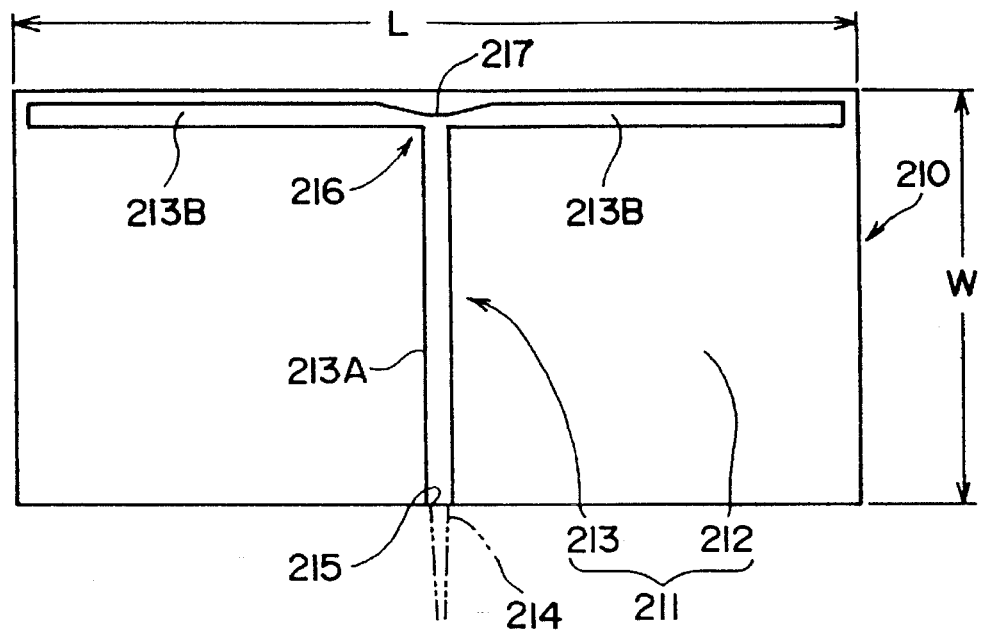
FIG. 11 is a plan view showing a die concerning a second embodiment of the invention.

FIG. 11 shows a die 210 concerning a second embodiment of the invention. The die 210 has cavity 211, which comprises a narrow gap portion 212 having a uniform thickness for forming a sheet-like portion of molding and a groove-like portion 213 having a greater thickness than the narrow gap portion 212 for forming sufficient thickness portions of the molding.

The groove-like portion 213 is substantially T-shaped in plan view. Its leg portion 213A of letter T has its free end constituting a connecting portion 215 connected to a sprue 214, which is formed in the die 210 in a central portion thereof in the longitudinal direction. The other end of the leg portion 213A constitutes a branch formation portion 216, at which the groove-like portion 216 is branched.

Figure 12:
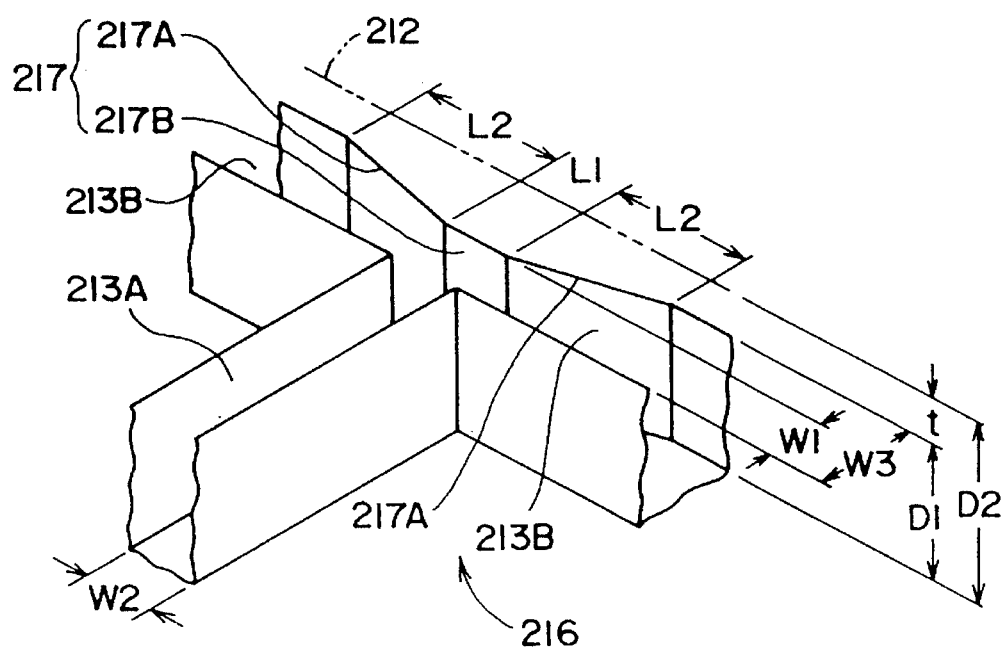
FIG. 12 is a fragmentary perspective view, to an enlarged scale, showing a sufficient thickness portion concerning the second embodiment.

The branch formation portion 216, as shown in FIG. 12, has an inverse frust-conical side surface 1217 which extends inwardly of the groove-like portion 213. The inverse frust-conical side surface 217 has opposite side inclined portions 217A inclined oppositely with a gentle inclination. The side surface 217 also has a non-inclined portion 217B between the opposite side inclined portions 217A.

The inverse frust-conical surface 217 throttles the distance between the side of the non-inclined surface 217B and the opposite side of the groove-like portion 216 to W1. This distance W1 is a substantial width of the branch formation portion 216, upon which successful injection molding is dependent.

Figure 13:
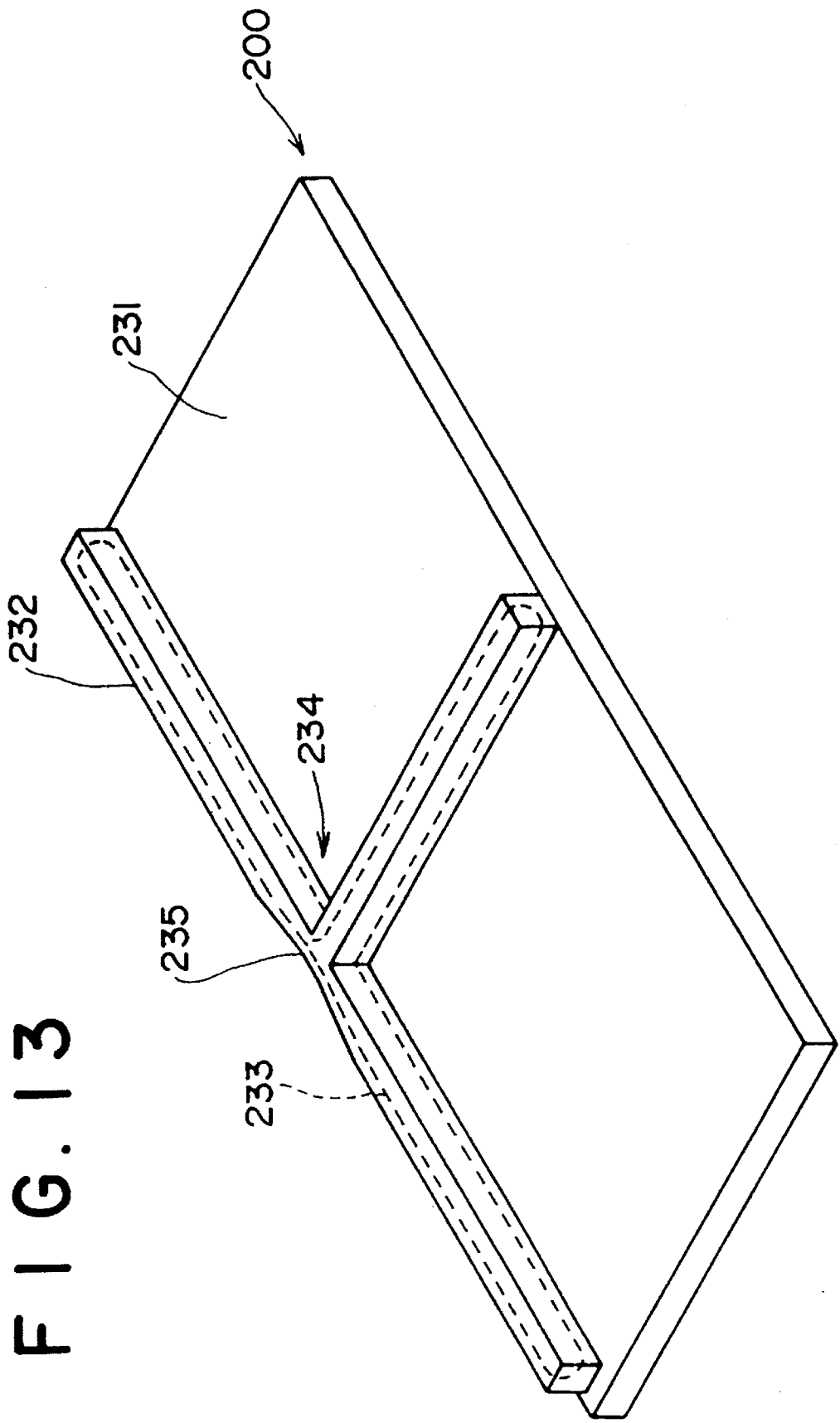
FIG. 13 is a perspective view showing the entire gas-introduced injection molded part as the second embodiment.

After starting the charging of molten resin into the die 210, gas is introduced into the molten resin that is charged. By so doing, a sheet-like injection part 200 as shown in FIG. 13 can be obtained.

The molded part 200 corresponds to the shape of the cavity 211 of the die 210, and it has a sheet-like small thickness portion 231 having a uniform thickness and a sufficient thickness portion 232 which has a greater thickness than the sheet-like small thickness portion 231. The sufficient thickness portion 232 has a gas channel 22 formed as an inner space, and also has a branch portion 234 having a shape of letter T.

The branch portion 234 has an intermediate throttle portion 235 which is formed by the inverse frust-conical surface 217 of the die 210. This throttle portion 235 throttles the sectional area of the branch portion 234 and also forcibly throttles the sectional area of the branch portion of the inner gas channel 233.

The setting of the width W1 of the branch portion 216 will now be described.

Referring back to FIG. 12, where the width W2 of the leg portion 213A of the groove-like portion 213 and the width W3 of an arm portion 213B in the letter T are related as $$W2 \leq W3/2$$

the width W1 of the branch portion 216 is desirably set as $$W1=W2.$$

On the other hand, where the widths W2 and W3 are related as $$W2>W3/2$$

the width W1 of the branch portion 216 is desirably set as $$W3/4 \leq W1 \leq W3/2.$$

The length L2 of the inclined portions 217A and the length L1 of the non-inclined portion 217B of the inverse frust-conical surface 217 are desirably set such that they are related to the width W3 of the leg portion 213B as $$W3 \leq L1 \leq 10 \times W3,$$

and $$2 \times W3 \leq L2 \leq 5 \times W3.$$

In this embodiment, the die 210 is set in an injection machine, then molten resin is charged into the die cavity 211, and then gas is introduced into the molten resin charge in the die 210. With the gas introduction, a gas channel 233 is formed along the groove-like portion 213. The gas pressure in the gas channel 233 is utilized to obtain close contact of the surface of the molten resin with the die 210, thus eliminating sink mark that might otherwise be formed in the surface of the part 200.

The inverse frust-conical surface 217 of the groove-like portion 213 forcibly throttles the sectional area of the branch portion of the gas channel 233. Thus, as gas passes through the narrowed portion, it pushes the molten resin in the branch portion 216, so that the molten resin does not stag therein. Thus, even through the gas channel 233 has the branch portion, the part 200 can have a uniform thickness.

With this embodiment, the following effects are obtainable.

Since the sectional area of the branch portion of the gas channel 233 is forcibly throttled so that the part 200 has a uniform thickness even through the gas channel 233 in the molding has the branch portion, it is possible to obtain a satisfactory part 200 free from sink mark.

Further, since the above effects are obtainable by the mere provision of the branch portion of the groove-like portion 216 with the inverse frust-conical surface 217, and also since the inverse frust-conical surface can be readily formed in every die, it is possible to improve the quality of the sheet-like small thickness molding so long as the molding has a gas channel.

[THIRD EMBODIMENT]

Figure 14:
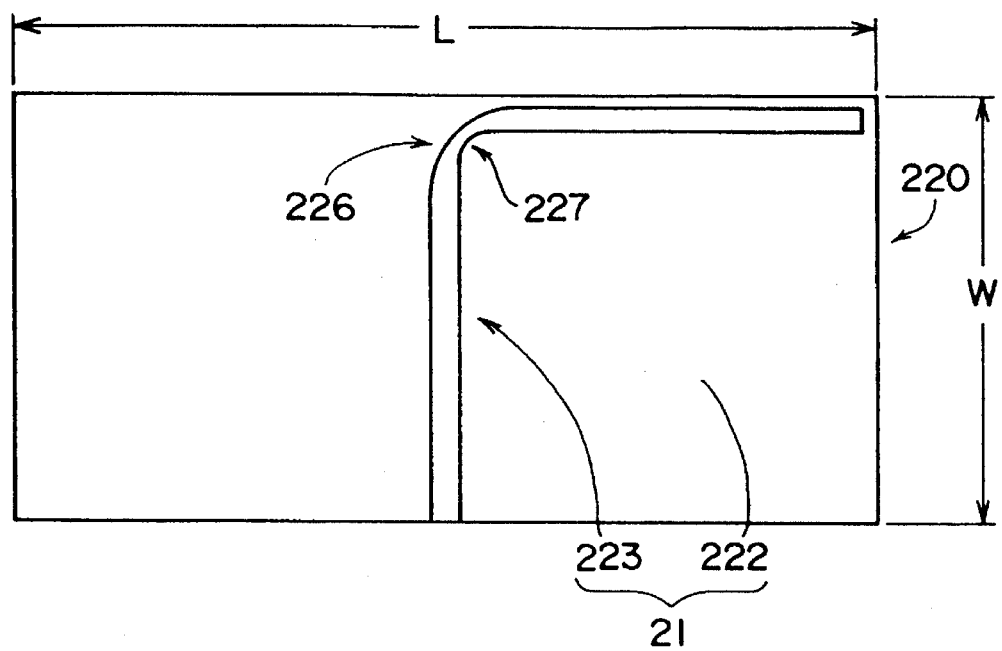
FIG. 14 is a plan view showing a die concerning a third embodiment of the invention.

FIG. 14 shows a die 220 concerning a third embodiment of the invention. In this embodiment, the groove-like portion has a corner portion which corresponds to the branch portion of the groove-like portion in the preceding second embodiment.

More specifically, a cavity 221 of the die 220, like the second embodiment, has a narrow gap portion 222 and a groove-like portion 223. The groove-like portion 223 is substantially L-shaped in plan view, and it has an intermediate corner portion 226.

Figure 15:
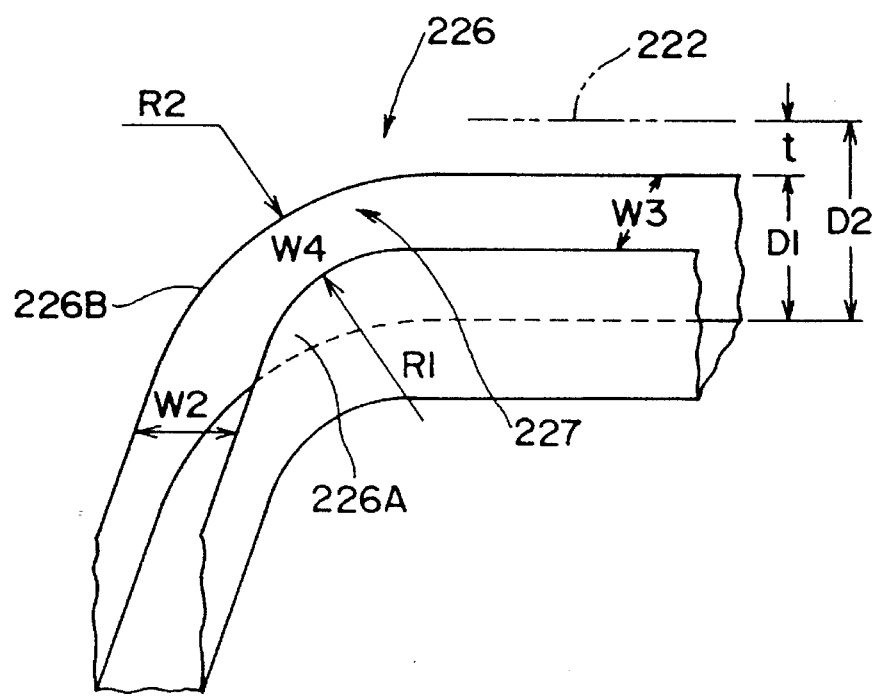
FIG. 15 is a fragmentary perspective view, to an enlarged scale, showing a sufficient thickness portion concerning the second embodiment.

The corner portion 226, as shown in FIG. 15, is in the form of an arcuate groove. Its inner and outer side surfaces 226A and 226B consist of parts of cylindrical surfaces with radii R1 and R2 of curvature. The inner and outer side surfaces 226A and 226B are made slightly eccentric so that they do not become parallel. Thus, the right corner of the corner portion 226 has a throttled inter-side distance W4, and it thus constitutes a narrowest throttle formation portion 227 in the groove-like portion 223.

The inter-side distance or width dimension W4 of the corner portion 226 is desirably set to about one half of the width W2, W3 of the straight portions of the groove-like portion 223.

With this embodiment, the same functions and effects as in the previous second embodiment are obtainable. In addition, the gas channel has a corner portion formed with a throttled portion having a forcibly throttled sectional area. The corner portion 226 thus provides for uniform thickness. It is thus possible to obtain an additional effect of obtaining a satisfactory molding utterly free from sink mark even in the corner portion 226 of the sufficient thickness portion 223.

Now, specific effects of the above second and third embodiments will be shown in connection with the following Experiment Examples 2 and 3.

[EXPERIMENT EXAMPLE 2]

Experiment Example 2 concerns gas-introduced injection molding conducted on the basis of the second embodiment of the invention. The injection molding was a rectangular sheet-like test piece, and the die used was the die 210 shown in FIG. 11.

[COMPARATIVE EXAMPLE 2]

Comparative Example 2 concerns gas-introduced injection molding conducted on the basis of the prior art to obtain a test piece of the same shape as in Experiment Example 2. As the die was used what was obtained by omitting the inverse frust-conical surface 217 from the die 210 in Experiment Example 2.

[Cavity Size Setting:]

In Experiment Example 2 and Comparative Example 2, the die cavity size was set as follows (see FIGS. 11 and 12).

(1) Length L: 420 mm (2) Height W: 100 mm (3) Thickness t of sheet-like portion: 3 mm

[Setting of Size of Gas Channel Guide Portions:]

In Experiment Example 2 and Comparative Example 2, the gas channel guide portion size setting was made as follows (see FIG. 12).

(1) Width W2, W3: 9 mm (2) Depth D1: 6 mm (3) Thickness D2 inclusive of sheet-like portion: 9 mm (4) Width W1 of branch portion (only in Experiment Example 2): 5 mm (5) Length L1 of non-inclined portion (only in Experiment Example 2): 10 mm (6) Length L2 of inclined portions (only in Experiment Example 2): 20 mm

[Molding Conditions:]

In Experiment Example 2 and Comparative Example 2, the injection molding was carried out under the following molding conditions.

(1) Resin used: Polypropylene ("J-750H" manufactured by Idemitsu Petrochemical Co., Ltd.)

(2) Resin temperature: 220° C.

(3) Die temperature: 40° C.

(4) Gas pressure: 8 MPa (5) Gas introduction delay time: 2 sec.

(6) Resin charging tine: 2 sec.

[Results:]

Figure 16A:
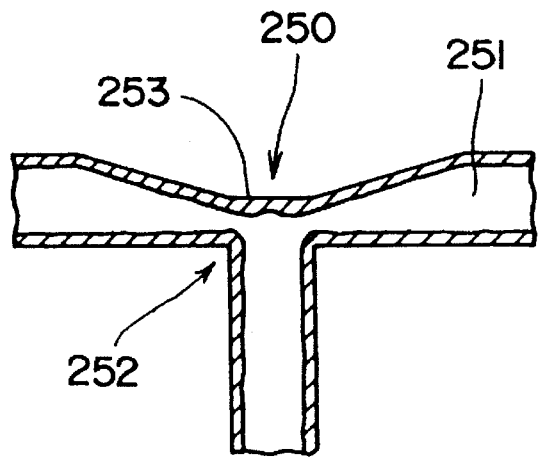
FIGS. 16(A) and 16(B) are fragmentary sectional views showing the results of experiments in Experiment Example 2 according to the invention and Comparative Example 2.

In Experiment Example 2, as shown in FIG. 16(A), a gas channel 251 was formed in the test piece 250. The side wall of the branch portion 252 of the gas channel 215 had a substantially uniform thickness. The test piece obtained thus was satisfactory with its surface utterly free from sink mark.

Figure 16B:
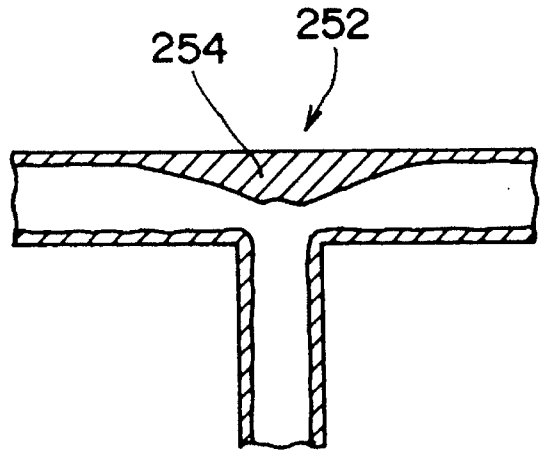

In Comparative Example 2, the injection molding was carried out under the same conditions as in Experiment Example 2. In this case, as shown in FIG. 16(B), the side wall of the branch portion 252 had a local increased thickness portion 254. The surface of this increased thickness portion 254 was formed with a sink mark when the molten resin was cooled down and solidified.

With an aim of preventing the generation of recession, the gas pressure was increased to 20 MPa, but recession was still generated. The gas pressure was further increased to 24 MPa. However, the sink mark could not be eliminated. Nevertheless, gas in the gas channel 251 leaked to the outside. Thus, the appearance of the test piece was spoiled.

[EXPERIMENT EXAMPLE 3]

Experiment Example 3 concerns gas-introduced injection molding conducted on the basis of the third embodiment of the invention. The injection molding was a rectangular sheet-like test piece. As the die was used the die 220 shown in FIG. 14.

[COMPARATIVE EXAMPLE 3]

Comparative Example 3 concerns an experiment of gas-introduced injection molding conducted on the basis of the prior art to produce a test piece of the same shape as in Experiment Example 3. As the die was used what was obtained by omitting the throttle formation portion 227 from the die 220 in Experiment Example 2.

[Cavity Size Setting:]

In Exaperiment Example 3 and Comparative Example 3, the individual cavity dimensions of the die 220 (see FIGS. 4 and 5) were set to the same values as in Experiment Example 2.

[Setting of Size of Gas Channel Guide Portions:]

In Experiment Example 3 and Comparative Example 3, of the dimensions of the gas channel guide portions (see FIGS. 15), the width W2, W3, depth D1 and thickness D2 were set to the same values as in Experiment Example 2.

Dimensions other than those above in Experiment Example 3 were set as follows.

(1) Radius R1 of inner side wall: 10 mm (2) Radius R2 of outer side wall: 30 mm (3) Width W4 of corner portion: 4.5 mm In Comparative Example 3, following dimensions were set.

(1) Radius R1 of inner side wall: 10 mm (2) Radius R2 of outer side wall: 19 mm

[Molding Conditions:]

In Experiment Example 3 and Comparative Example 3, the injection molding was carried out under the same molding conditions as in Experiment Example 2.

[Results:]

Figure 17A:
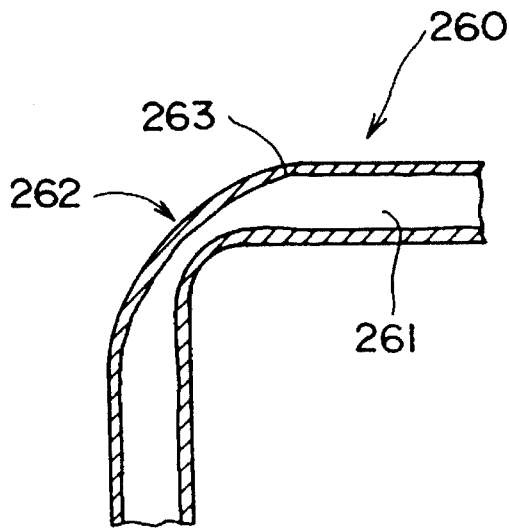
FIGS. 17(A) and 17(B) are fragmentary sectional views showing the results of experiments in Experiment Example 3 according to the invention and Comparative Example 3.

In Experiment Example 3, as shown in FIG. 17(A), a gas channel 261 was formed inside the test piece 260. The side wall 263 of the corner portion 262 of the gas channel 261 had a substantially uniform thickness. Thus, like Experiment Example 2, the test piece obtained was satisfactory with its surface utterly free from sink mark.

Figure 17B:
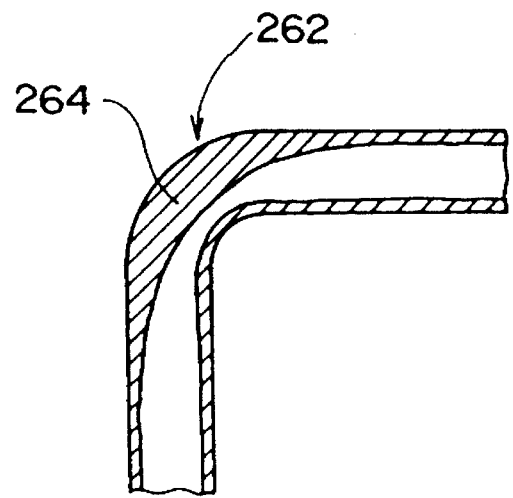

In Comparative Example 3, as shown in FIG. 17(B), the side wall of the corner portion 262 had a local increased thickness portion 264. When the molten resin was cooled down and solidified, sink mark was generated in the surface of the increased thickness portion 264 and spoiled the appearance of the test piece.

The above second and third embodiments are by no means limitative, and the following modifications are possible.

In the second and third embodiments the sectional area of the branch portion or corner portion was throttled by reducing the width dimension of the sufficient thickness formation portion. Alternatively, the sectional area may be throttled by reducing the height dimension of the sufficient thickness formation portion. For example, an inverse frust-conical surface 273 may be formed as a ceiling surface 271 of the branch portion 271 as shown in FIG. 18.

Further, the branch portion may not be the T-shaped three-way branch, and it may be a Y-shaped three-way branch, a cross branch, or a star-shaped five-way branch. Where straight lines cross as in the cross branch, inverse frust-conical surfaces 282 may be provided on only bending branch lines 281, as shown in FIG. 19.

Further, the inverse frust-conical surface of the branch portion or the throttle formation portion of the corner portion may be replaced with a movable die section. For example, as shown in FIG. 20, a movable die section 291 may be provided such that it can be advanced and retreated with respect to the branch portion 292. With this arrangement, the extent of advancement of the movable die 291 may be made adjustable in correspondence to the fluidity of molten resin or the like. By so doing, the molding thickness may be made to be uniform irrespective of the fluidity of resin.

In the gas-introduced injection molding, the advancement of the movable die section 291 toward the branch portion 292 may be caused at a suitable instant after the start of charging of molten resin into the die, and afterwards the gas introduction into the charged molten resin may be caused. Doing so has an effect of adjusting the gas channel to an adequate volume with the adjustment of the advancement of the movable die section 291 even if the amount of the charged molten resin is varied slightly.

[FOURTH EMBODIMENT]

Figure 21:
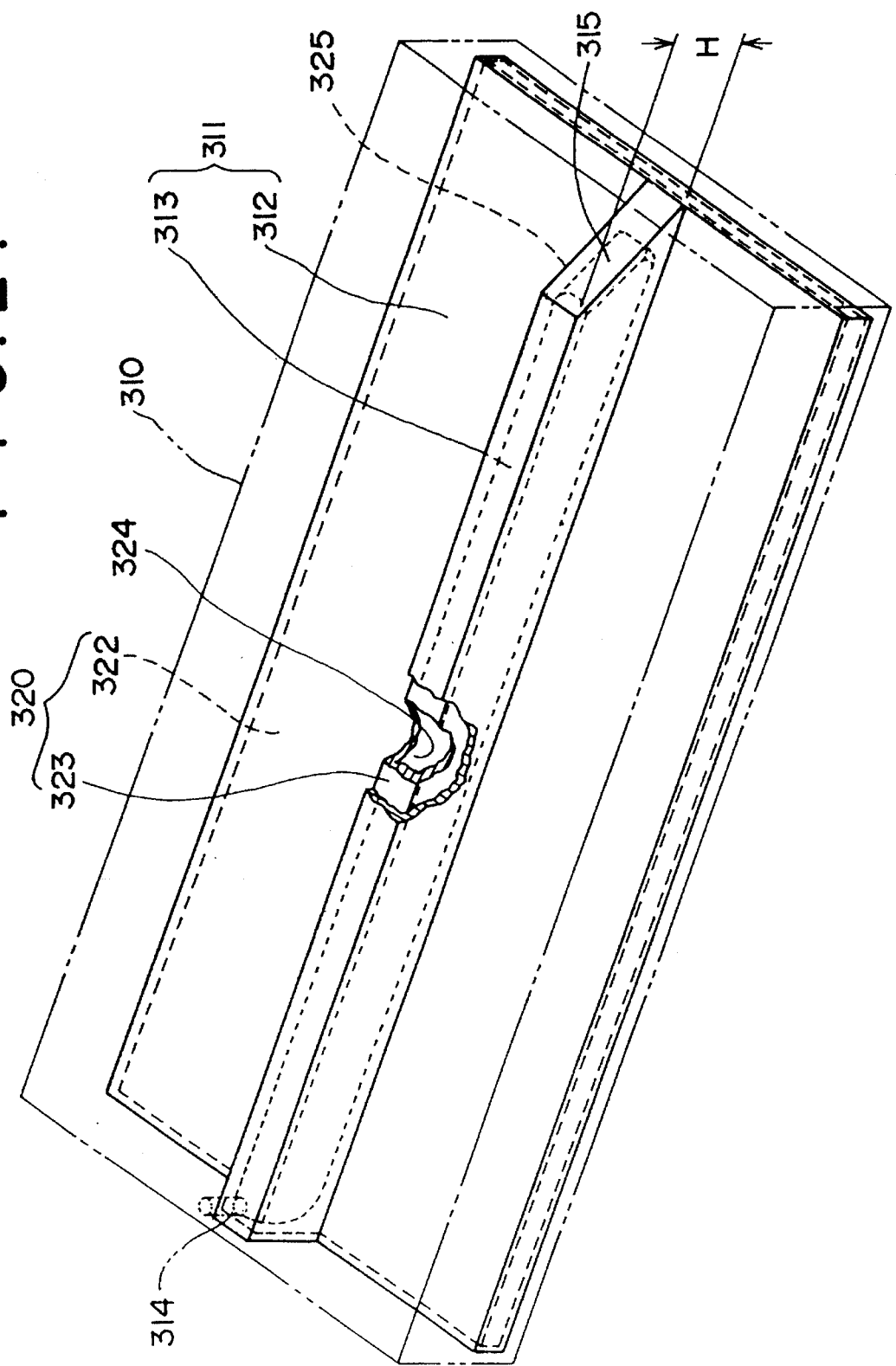
FIG. 21 is a plan view showing a die concerning a fourth embodiment of the invention.

FIG. 21 shows the shape of a cavity 311 formed in a die 310 concerning this embodiment. The cavity 311 has a narrow gap portion 312 having a uniform thickness and a groove-like portion 313 having a greater thickness than the narrow gap portion 312.

The narrow gap portion 312 is for forming a sheet-like small thickness portion 322 of part 320 as it is filled with molten resin.

The groove-like portion 313 extends along the longitudinal center line of the cavity 311, and is for forming a straight sufficient thickness portion 323 of the part 320. With molten resin charged into the groove-like portion 313 and gas introduced into the charged molten resin, a gas channel 324 is formed inside the sufficient thickness portion 323 along the groove-like portion 313.

A gas inlet port 314 is open at one end of the groove-like portion 313, and the other end thereof has a tapered throttle formation portion 315 which is tapered from a predetermined position in the direction of the gas introduction.

Specifically, the throttle formation portion 315 is wedge-like with its height H, and hence its sectional area, reduced as one goes toward the end. This throttle formation portion 315 permits formation, at the end of the sufficient thickness portion 323, with a tapered end portion 325 tapered from a predetermined position in the direction of the gas introduction.

The rate of reduction of the sectional area of the throttle formation portion 315, i.e., the tapered end portion 325, is set to a small value in order to be able to readily obtain a commonly termed "wedge effect" for promoting the progress of gas.

Thus, even when the rate of gas introduction is reduced with increase of the amount of the charged molten resin, a sufficient amount of gas can be introduced into the tapered end portion 325, and this gas introduction eliminates generation of sink mark in the surface of the tapered end portion 325.

The volume of the throttle formation portion 315, i.e., the tapered end portion 325, is set to be sufficiently large lest the introduced gas should break the tapered end portion 325 and form a hole in the molten resin.

With this arrangement, even when the amount of introduced gas is increased with reduction of the rate of charging of molten resin, there is no possibility for the gas to break the tapered end portion 325 and form a hole open on the surface of the part 320.

The size of the tapered end portion 325 is set such as to be able to absorb fluctuations of the charged amount of molten resin by ±0.5% of the volume of the groove-like portion 313 that might be caused by "charging fluctuations".

In this embodiment, the die 310 is set in an injection machine, then molten resin is charged into the cavity 311, and after the start or completion of the charging gas is introduced into the molten resin charged in the die 310. With this gas introduction, a gas channel 324 is formed along the groove-like portion 313, and the gas pressure in the gas channel 324 is utilized to obtain close contact of the surface of the molten resin with the die 310, thus eliminating sink mark that might otherwise be generated in the surface of the molding 320.

Since the tapered end portion 325 that is formed by the throttle formation portion 315 of the groove-like portion 313 can absorb the molten resin fluctuations due to "charging fluctuations", it is not necessary to stringently control the rate of charging of molten resin, gas pressure, die temperature, etc.

With this embodiment, the following effects are obtainable.

Since the tapered end portion 325 that is formed by the throttle formation portion 315 of the groove-like portion 313 is adapted to absorb charged molten resin fluctuations due to "charging fluctuations", generation of sink mark or hole or any other defects can be eliminated without need of stringent control of the rate of charging of molten resin, gas pressure, die temperature, etc.

Further, since satisfactory gas-introduced injection molding is obtainable without stringent control of the rate of charging of molten resin, gas pressure, die temperature, etc., it is possible to simplify the controller of the gas-introduced apparatus.

Further, since the mere provision of the tapered throttle formation portion 315 at the end of the groove-like portion 313 allows formation of the tapered end portion 325, the effects noted above are obtainable by simple remodeling of the die. In addition, the throttle formation portion 315 is applicable to every die so long as the die is for producing a molding with a gas channel. Thus, it allows improvement of the quality of a sheet-like small thickness molding.

Now, specific effects of the fourth embodiment of the invention will be shown in connection with the following experiment example.

[EXPERIMENT EXAMPLE 4]

Figure 22:
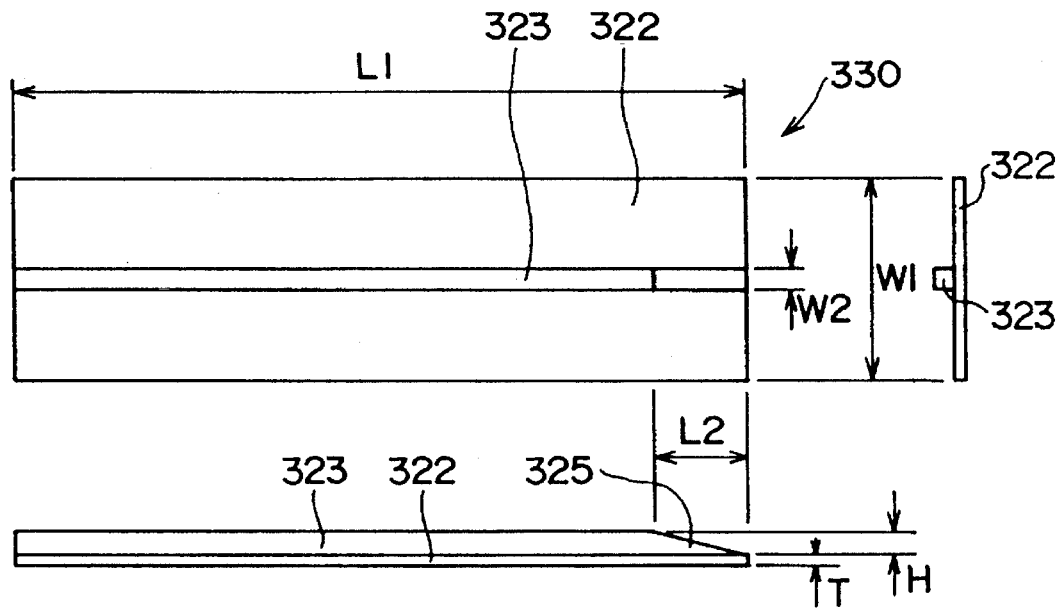
FIG. 22 consists of a plan, a side and an elevational view showing a part in Experiment Example 4 according to the invention.

In Experiment Example 4, gas-introduced injection molding was carried out 100 times continuously on the basis of the fourth embodiment of the invention. The die used as the die 310 shown in FIG. 21 having a substantially sheet-like cavity 311. The injection molding was a rectangular sheet-like test piece 330 as shown in FIG. 22.

[COMPARATIVE EXAMPLE 4]

Figure 23:
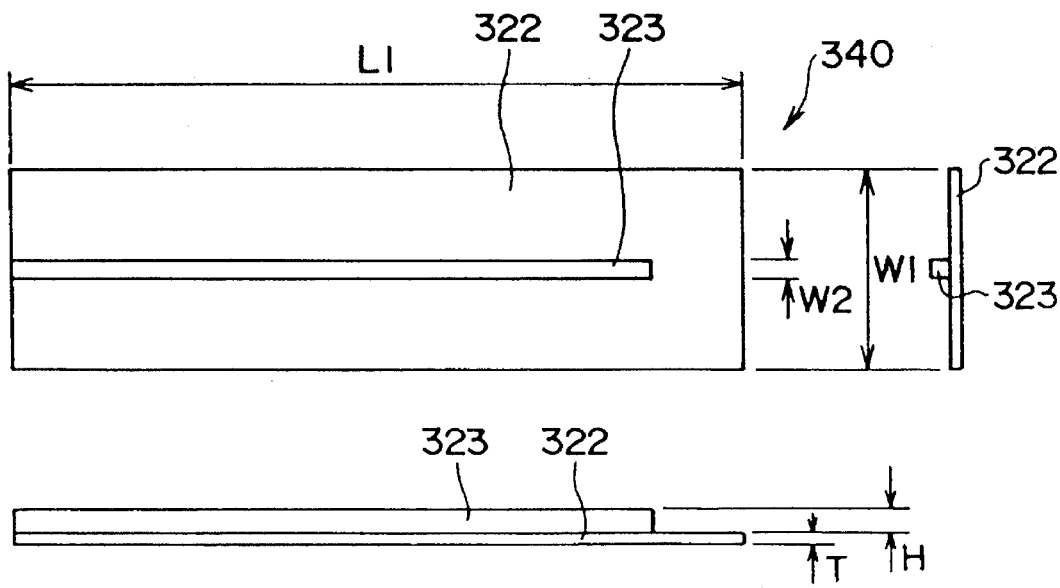
FIG. 23 consists of a plan, a side and an elevational view showing a molding in Comparative Example 4.

In Comparative Example 4, the gas-introduced injection molding was carried out 100 times continuously on the basis of the prior art. The injection molding was a test piece as shown in FIG. 23, having the same shape as in Experiment Example 4 except it did not have the tapered end portion 325.

[Setting of Test Piece Size:]

In Experiment Example 4 and Comparative Example 4, the test piece size was set as follows (see FIGS. 22 and 23).

(1) Total length L1: 420 mm (2) Total width W1: 100 mm (3) Thickness T of sheet-like small thickness portion: 3 mm (4) Width W2 of sufficient thickness portion: 6 mm (5) Height H of sufficient thickness portion: 5 mm (6) Length L2 of tapered end portion: 40 mm (only in Experiment Example 4)

[Molding Conditions:]

In Experiment Example 4 and Comparative Example 4, the injection molding was carried out under the following molding conditions.

(1) Resin used: Polypropylene ("J-3054H" manufactured by Idemitsu Petrochemical Co., Ltd.)

(2) Resin temperature: 220° C.

(3) Die temperature: 30° C.

(4) Gas pressure: 6 MPa (5) Injection time: 2 sec.

(6) Apparatus: "IS-200CN" manufactured by Toshiba Kikai Co., Ltd.

[Results:]

Figure 24:
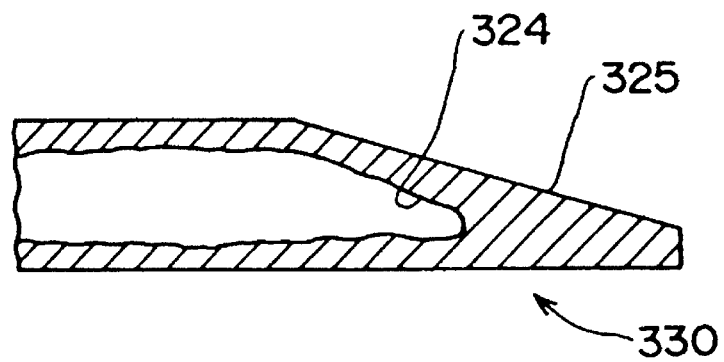
FIG. 24 is a fragmentary sectional view, to an enlarged scale, showing the result of experiment in Experiment Example 4.

In Experiment Example 4, all the obtained test pieces 330, as shown in FIG. 24, had a gas channel 324 reaching the inside of the tapered end portion 325.

The weight of the test pieces 330 was measured to find that the heaviest was 114.1 g and the heaviest was 114.9 g. The average weight was found to be 114.6 g.

The length of the gas channel 324 was measured and found to be 387 mm with the lightest test piece and 381 mm with the heaviest test piece. The average length was found to be 383 mm.

From the above measurement values, it will be seen that the amount of molten resin that was charged in each injection molding fluctuated as "charging fluctuations" in a range of −0.5 to +0.3 g and that due to these "charging fluctuations" the length of the gas channel 324 fluctuated in a range of −2 to +4 mm.

All the test pieces 330 were visually inspected to find that each test piece was free from sink mark in its surface. Thus, it will be seen that the fluctuations of the amount of charged molten resin as "charging fluctuations" could be sufficiently absorbed by the tapered end portion 325 which was 40 mm in length.

In Comparative Example 4, like Experiment Example 4, the weight and the length of the gas channel 324 of all the test pieces 340 were measured. The weight was 113.4 g with the lightest test piece and 114.6 g with the heaviest test piece. The average weight was found to be 114.3 g.

The length of the gas channel 324 was 377. 8 mm with the lightest test piece and 374.6 mm with the heaviest test piece. The average length was 376.1 mm.

It will be seen from the above measurement values that the amount of molten resin charged in each injection molding fluctuated as "charging fluctuations" in a range of −0.9 to +0.3 g and that due to these "charging fluctuations" the length of the gas channel 324 fluctuated in a range of −1.5 to +1.7 mm.

Figure 25:
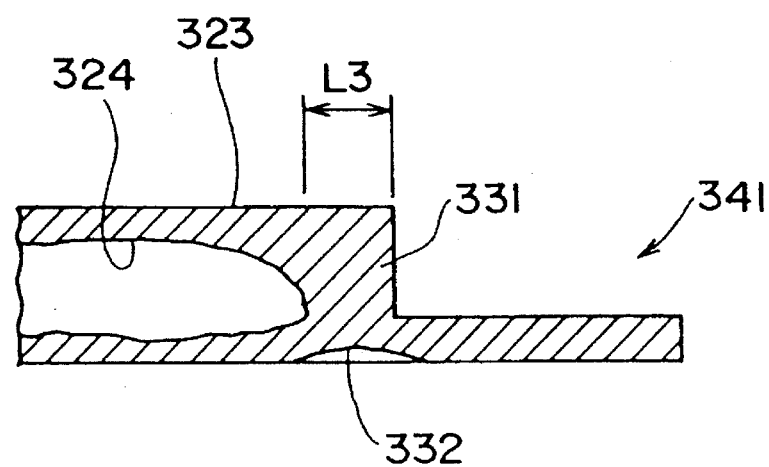
FIG. 25 is a fragmentary sectional view, to an enlarged scale, showing the result of experiment in Comparative Example 4.

All the test pieces were visually inspected. It was found that heavy test pieces had sink mark in their surface. The heaviest test piece was internally inspected to find that, as shown in FIG. 25, the gas channel 324 could not reach the inside of the end portion 331 of the sufficient thickness portion 323. That is, the end portion 331 was fully occupied by the resin and solid. The end portion 331, which had a length L3 of 5.4 mm, had a recession 332 with a depth of 15 microns generated in its surface.

The above fourth embodiment is by no means limitative, and the following modifications are possible.

While in the above fourth embodiment the height H of the throttle formation portion was reduced gradually to provide a taper, this is by no means limitative; for instance, it is possible to gradually reduce the width W2 as shown in FIG. 26 or gradually reduce both the height H and the width W2 as shown in FIG. 27.

Figure 28:
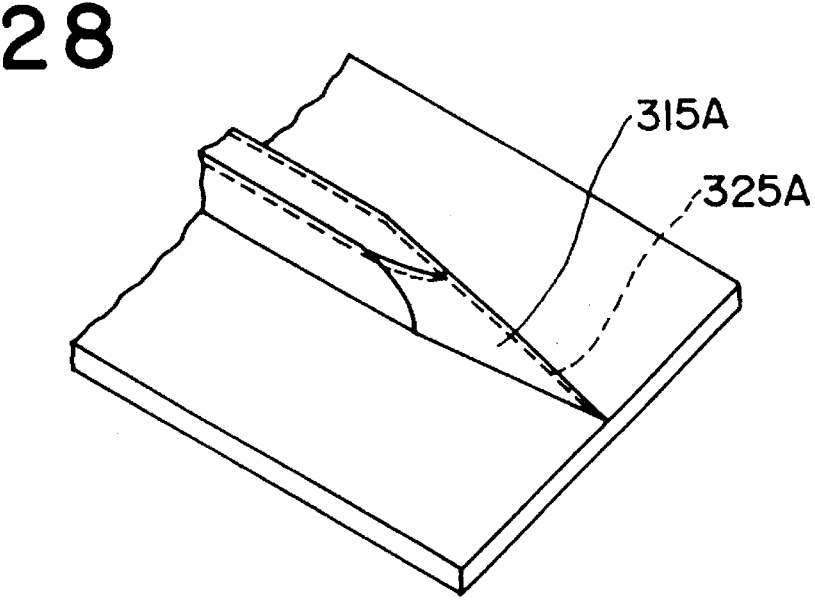
FIG. 28 is a fragmentary perspective view showing a further modification of the fourth embodiment.
Figure 29:
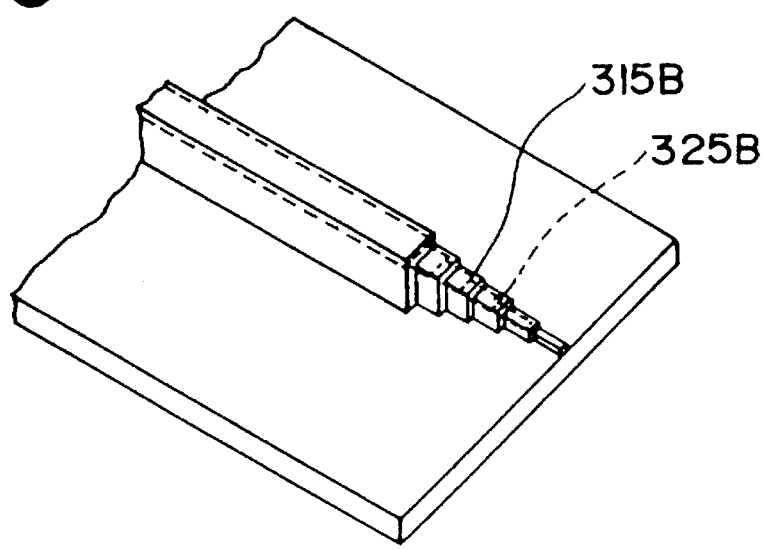
FIG. 29 is a perspective view showing a still further modification of the fourth embodiment.

Further, it is not essential that the shape of the throttle formation portion and tapered end portion is constituted by flat surfaces alone; for instance, a throttle formation portion 315A and an end portion 325A having curved surfaces as shown in FIG. 28 and also a throttle formation portion 315B an end portion 325B with the section area reduced step-wise as shown in FIG. 29, are covered by the invention.

Further, while the sufficient thickness portion was formed such that it is like a straight ridge, this is by no means limitative; for instance, it may be H-shaped in plan view, and its plan view shape may be suitable selected in practice.

Moreover, the gas-introduced injection molding may not be sheet-like in shape and may be box-like as well. In general, the invention is applicable to obtain a molding, which has one or more flat surfaces or surfaces formed as a combination of flat and curved surfaces.

What is claimed is:

1. A gas introduced injection molding formed by charging molten resin into a die and introducing a gas into said molten resin comprising:

a small thickness sheet portion formed as a sheet and having a uniform thickness; and a framework portion having a predetermined thickness and wall means defining a space therein, said framework portion integrally formed with said sheet portion at least on one side thereof and extending linearly to define a framework for said sheet portion, said framework portion including a plurality of linearly extending straight portions and at least one of a corner portion, which connects two of said straight portions and has a predetermined angle of bend, and a branch portion, which connects at least three of said straight portions, said framework portion including a throttled portion at said at least one of said corner portion and said branch portion which has a reduced cross sectional area relative to said straight portions adjacent thereto.

2. The gas-introduced injection molding according to claim 1, wherein the thickness of said small thickness sheet portion is set to be in a range of 25 to 35% of the thickness of said framework portion.

3. The gas-introduced injection molding according to claim 1, wherein said throttled portion at said branch portion has an inverse frustoconical side surface formed by a corresponding frust-conically projecting surface of said die.

4. The gas-introduced injection molding according to claim 3, wherein said straight portions have the same sectional profile and the same size, and the plan view of said frustoconically projecting surface is such that the height is in a range of 25 to 50% of the width of said framework portion, that the length of the top of the frustoconically projecting surface is in a range of 100 to 1,000% of the width of said framework portion and that the length of the opposite inclined sides extending from the top is in a range of 200 to 500% of the width of said framework portion.

5. The gas-introduced injection molding according to claim 1, wherein said corner portion has an arcuate shape, and said throttled portion is a reduced width portion of said arcuate corner portion.

6. The gas-introduced injection molding according to claim 5, wherein said straight portions have the same sectional profile and the same size, and said throttled portion is formed by reducing the width of said arcuate corner portion to a range of 40 to 60% of the width of said straight portions.

7. The gas-introduced injection molding according to claim 1, wherein said framework portion has a throttled end portion, in which the sectional area of said space is reduced progressively from a predetermined position in the direction of the gas introduction.

8. The gas-introduced injection molding according to claim 7 wherein said throttled end portion has a wedge shape which is formed by a corresponding wedge-shaped end portion of a groove portion provided in said die.

9. The gas-introduced injection molding according to claim 8, wherein said wedge-shaped end portion is such that the height of the wedge-shape is 10 to 20% of the length of the bottom of said wedge-shape.

10. The gas-introduced injection molding according to claim 1, wherein said small thickness sheet portion is rectangular in plan view shape, and said framework portion extends along the four sides and diagonals of said rectangular shape.

11. The gas-introduced injection molding according to claim 1, wherein said small thickness sheet portion is rectangular in plan view shape, and said framework portion is T-shaped in plan view and has an arm portion extending along one side of said rectangular shape.

12. The gas-introduced injection molding according to claim 1, wherein said small thickness sheet portion is rectangular in plan view shape, and said framework portion is L-shaped in plan view with two said straight portions being provided and has at least one of said two straight portions extending along one side of said rectangular shape.

13. The gas-introduced injection molding according to claim 7, wherein said small thickness sheet portion is rectangular in plan view shape, and said small thickness sheet portion is straight and extends along the longitudinal center line of said rectangular shape.

* * * * *